(12) United States Patent
Huang et al.

(10) Patent No.: US 7,584,871 B2
(45) Date of Patent: Sep. 8, 2009

(54) GREASE OUTPUT DEVICE FOR AN ELECTRICAL GREASE GUN

(75) Inventors: San-I Huang, Taichung (TW); Hao-Jung Yeh, Taichung (TW); Simon Wu, Taichung (TW)

(73) Assignee: Techway Industrial Co., Ltd., Taichung (TW)

( * ) Notice: Subject to any disclaimer, the term of this patent is extended or adjusted under 35 U.S.C. 154(b) by 571 days.

(21) Appl. No.: 11/507,449

(22) Filed: Aug. 22, 2006

(65) Prior Publication Data

US 2008/0047980 A1 Feb. 28, 2008

(51) Int. Cl.
*G01F 11/10* (2006.01)
(52) U.S. Cl. ............... 222/263; 222/333; 184/105.2
(58) Field of Classification Search ......... 222/261–263, 222/256–258, 275, 333; 184/105.2, 105.1
See application file for complete search history.

(56) References Cited

U.S. PATENT DOCUMENTS

| | | | | |
|---|---|---|---|---|
| 4,664,298 A | * | 5/1987 | Shew | 222/287 |
| 5,609,274 A | * | 3/1997 | Shih et al. | 222/262 |
| 5,762,239 A | * | 6/1998 | Cossette | 222/326 |
| 5,909,830 A | * | 6/1999 | Bates et al. | 222/327 |
| 6,540,113 B2 | * | 4/2003 | Gardos | 222/137 |
| 7,249,695 B2 | * | 7/2007 | Shew | 222/333 |
| 7,523,843 B2 | * | 4/2009 | Shew et al. | 222/262 |
| 2004/0231927 A1 | * | 11/2004 | Huang et al. | 184/105.2 |
| 2005/0249616 A1 | * | 11/2005 | Huang et al. | 417/415 |
| 2006/0060426 A1 | * | 3/2006 | Chen | 184/105.2 |
| 2006/0091161 A1 | * | 5/2006 | Cen | 222/333 |
| 2006/0108180 A1 | * | 5/2006 | Grach et al. | 184/105.2 |
| 2006/0278660 A1 | * | 12/2006 | Zhang | 222/262 |

* cited by examiner

*Primary Examiner*—Lien T Ngo
(74) *Attorney, Agent, or Firm*—Bacon & Thomas, PLLC

(57) ABSTRACT

A grease output device for an electrical grease gun has a body, a double-cam member and a driving member. The body has a holder and a seat mounted with the holder. The double-cam member connects to the body and has a driven unit and a driving unit. The driven unit has a driven gear and two cams misaligning with the driven gear. The driving gear has two rings mounted around the cams and two pistol rods connecting to the rings. The driving unit has a driving gear engaging with the driven gear. The driving member connects to the body to rotate the driving gear so the driven gear is rotated to push the rings. Hence, the grease can flow out of the body successively by the pistol two pistol rods moving back and forth alternatively.

13 Claims, 8 Drawing Sheets

US 7,584,871 B2

GREASE OUTPUT DEVICE FOR AN ELECTRICAL GREASE GUN

BACKGROUND OF THE INVENTION

1. Field of the Invention

The present invention relates to a grease output device for an electrical grease gun, and more particularly to a grease output device, with which grease can be squeezed out successively.

2. Description of the Related Art

Machines works smoothly via being added grease. However, the machines are exposed in the air such that the grease is easy to contaminate or spoiled. Hence, the grease should be renewed once in a while.

With reference to FIGS. 7 and 8, an electrical grease gun is used to renew the grease. A conventional grease output device of an electrical grease gun has a body (60), a seat (61), a nozzle (62), an adjusting member (63), a motor (64), a planet gear assembly (65) and a sliding member (66).

The body (60) has a passage (601) and a tube (602) mounted on a lower end of the body (60). The seat (61) connects to the body (60). The nozzle (62) is mounted on the body (60), corresponds to the tube (602) and communicates with the passage (601). The adjusting member (63) is mounted in the body (60) between the nozzle (62) and the passage (601) to control the output pressure of the grease through the nozzle (62). The motor (64) is mounted on the body (60) above the seat (61) to drive the planet gear assembly (65) to move the sliding member (66).

The sliding member (66) has an eccentric wheel (661), a bar (662), a block (663) and pistol post (664). The eccentric wheel (661) is driven by the planet gear assembly (65). The bar (662) connects to the eccentric wheel (661) eccentrically so that the bar (662) can drive the block (663) to move back and forth via the rotation of the eccentric wheel (661). A first end of the pistol post (664) connects to the block (663) and a second end of the pistol post (664) is inserted into the passage (601) so that the grease can be squeezed out of the nozzle (63) successively via the movement of the block (663).

However, the bar (662) drives the block (663) to move only at one side of the bar (662). The force only exerting at one side of the bar (662) easily applies torque to the bar (662) to deform the bar (662). Therefore, the diameter of the bar (662) needs to be enlarged to against the torque. Furthermore, the torque also causes the block (663) to be worn at only one side. The block (663) cannot move smoothly after being worn at only one side.

Therefore, the invention provides a grease output for an electrical grease gun to mitigate or obviate the aforementioned problems.

SUMMARY OF THE INVENTION

The main objective of the present invention is to provide a grease output device for an electrical grease gun with which grease can be exported successively.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
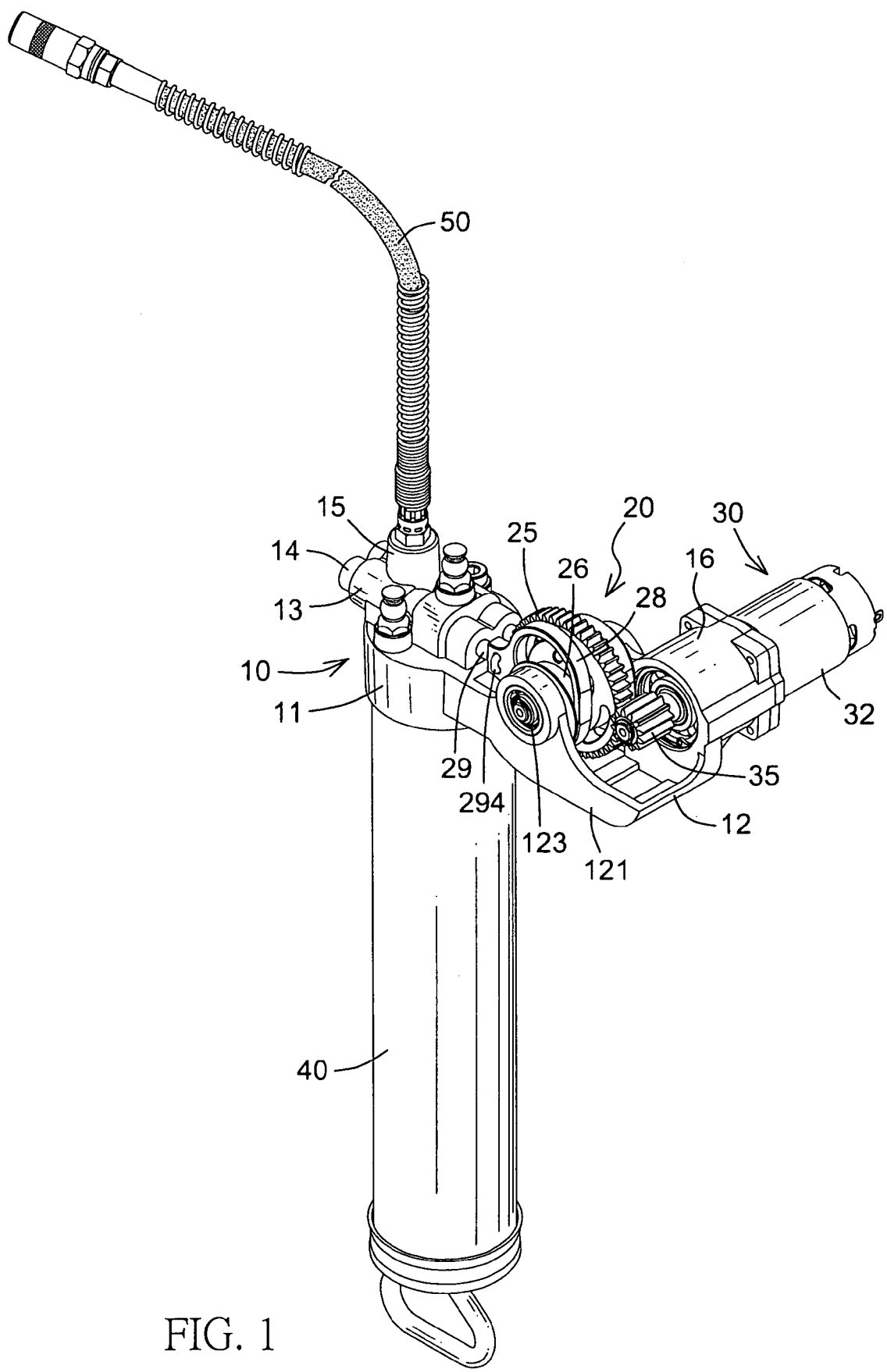
FIG. 1 is a perspective view of an electrical grease gun with a grease output device in accordance with the present invention.
Figure 2:
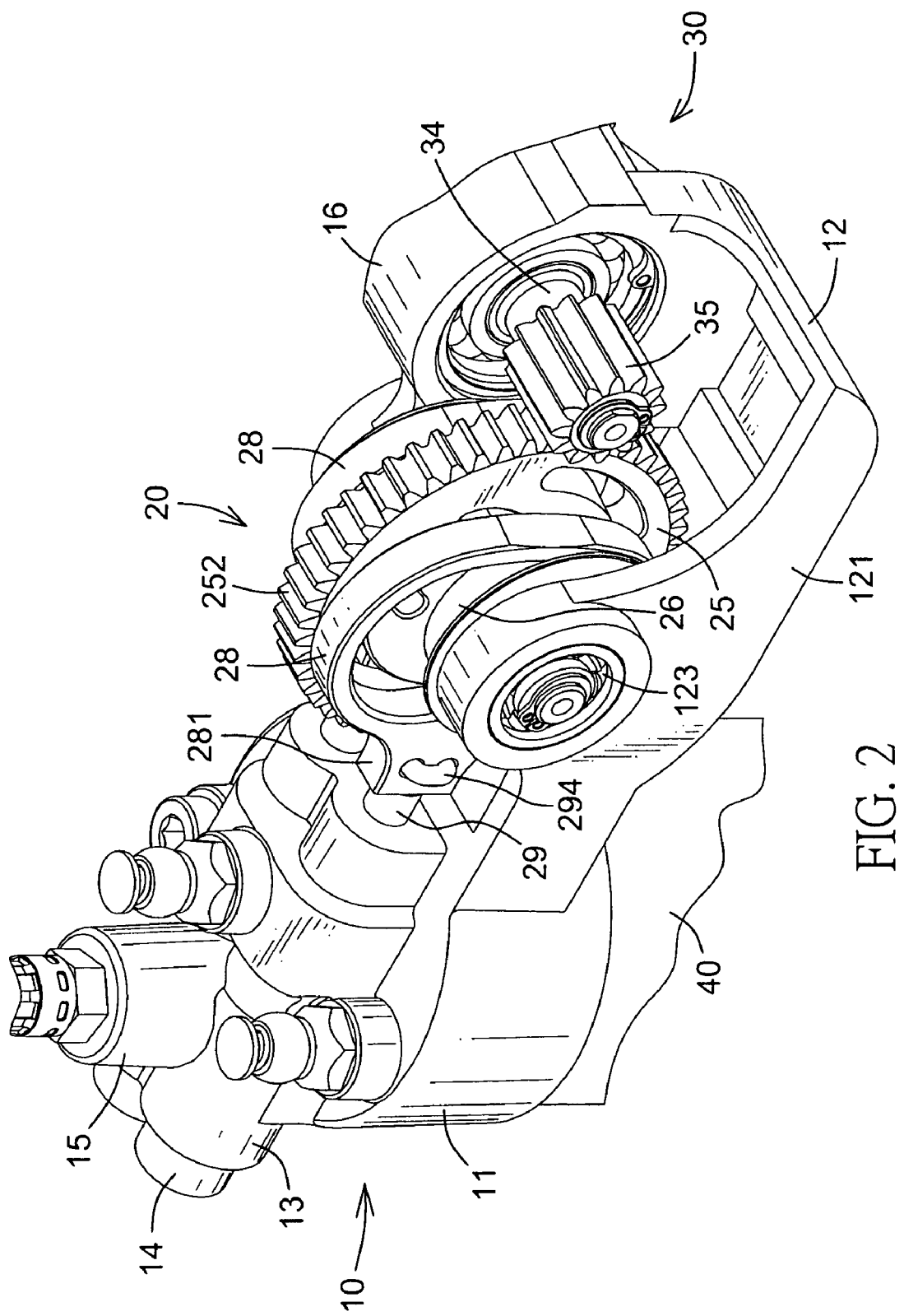
FIG. 2 is an enlarged perspective view of the grease output device for the electrical grease gun in FIG. 1.
Figure 3:
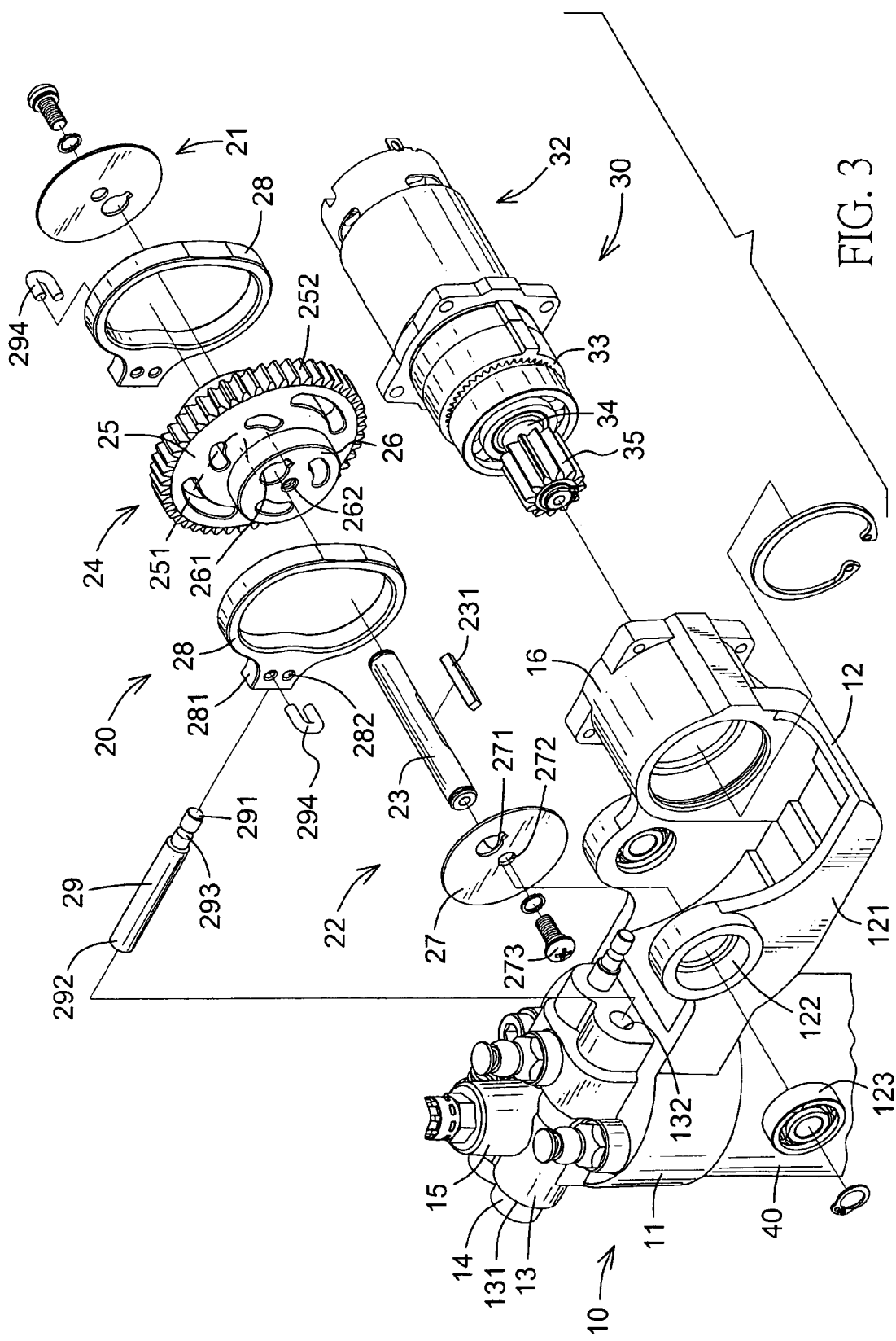
FIG. 3 is an enlarged exploded perspective view of the grease output device for the electrical grease gun in FIG. 1.

With reference to FIGS. 1-4, a grease output device for an electrical grease gun in accordance with the present invention has a body (10), a double-cam member (20), and a driving member (30).

The body (10) has a holder (11), a seat (12), two pipes (13), an adjusting member (14), a jointing tube (15) and a collar (16). A bottom end of the holder (11) connects to a grease tube (40). The seat (12) connects to the holder (11). The pipes (13) are mounted on a top end of the holder (11), communicate with the grease tube (40) and are parallel with each other. Therefore, grease (41) in the grease tube (40) can be drawn into the pipes (13). Each pipe (13) has an outer opening (131) and an inner opening (132). The adjusting member (14) connects to the outer openings (131) of the pipes (13). The jointing tube (15) is formed on the top end of the holder (11) near the outer openings (131) of the pipes (13) and communicates with the pipes (13). Atop end of the jointing tube (15) connects to a nozzle (50).

The seat (12) has two fastening boards (121) respectively mounted on two sides of the seat (12). Each fastening board (121) has a hole (122) defined through the fastening board (121) and a bearing (123) inserted into the hole (122). The collar (16) is formed on one of the fastening boards (121).

The double-cam member (20) connects to the body (10) and has a driven unit (21) mounted rotatably on the seat (12) and a driving unit (22) connecting to the driven unit (21). The driven unit (21) has a bar (23), a wheel assembly (24) connecting to the bar (23), and two caps (27) mounted on the wheel assembly (24). The bar (23) is inserted into the bearings (123) and has a key (231) axially mounted on the bar (23). Two ends of the bar (23) are inserted respectively into the bearings (123).

The wheel assembly (24) is mounted around the bar (23) and has a driven gear (25) and two cams (26) respectively mounted on two sides of the driven gear (25). The driven gear (25) has a first keyed hole (251) defined through a center of the driven gear (25) and engaging the key (231) on the bar (23) and multiple teeth (252) formed continuously on a periphery of the driven gear (25). The cams (26) are located eccentrically on the driven gear (25) and are mounted respectively on two sides of the first keyed hole (251) in the driven gear (25) and the cams (26) misalign with each other. A second keyed hole (261) is defined in each cam (26), communicates with the first keyed hole (251) in the driven gear (25) and engages with the bar (23). A threaded hole (262) is defined in a center of each cam (26) and is adjacent to the second keyed hole (261) in the cam (26).

Two caps (27) respectively attach to the cams (26) and each cap (27) has a first through hole (271) and a second through hole (272) respectively defined through the cap (27). The first through hole (271) corresponds to the second keyed hole (261) in the corresponding cam (26) and the second through hole (272) corresponds to the threaded hole (262) in the corresponding cam (26). Two bolts (273) are inserted respectively into the second through holes (272) in the caps (27) and respectively screw into the threaded holes (262) in the cams (26) to attach the caps (27) to the cams (26).

The driving unit (22) has two rings (28) and two pistol rods (29). Each ring (28) is mounted around one of the cams (26). Each ring (28) has an ear (281) adjacent to one of the inner openings (132) of the pipe (13). Multiple jointing holes (282) are defined through the ear (281).

The pistol rods (29) respectively connect to the rings (28) and each pistol rod (29) has a head (291), a foot (292), a notch (293) and a U-shaped clasp (294). The head (291) is formed in a first end of the pistol rod (29) and the foot (292) is formed in a second end of the pistol rod (29). The notch (293) is defined around the pistol rod (29) adjacent to the head (291). The U-shaped clasps (294) are inserted into the jointing holes (282) in the ring (28) and are mounted respectively around the notches (293) of the pistol rods (29) to mount the pistol rods (29) securely on the rings (28). The foots (292) are inserted respectively into the pipes (13) via the inner openings (132) so that the rings (28) can drive the pistol rods (29) to move axially back and forth and the grease (41) can be pushed out of the connecting tube (15).

The driving member (30) connects to the body (10) and drives the double-cam member (20). The driving member (30) has a motor (32) attached to the collar (16), a planet gear assembly (33), an axle (34) and a driving gear (35). The planet gear assembly (33) connects to the motor (32). The axle (34) connects to the planet gear assembly (33) and extends out of the collar (16). The driving gear (35) is mounted securely on the axle (34) and engages with the driven gear (25) to rotate the driven gear (25).

Figure 4:
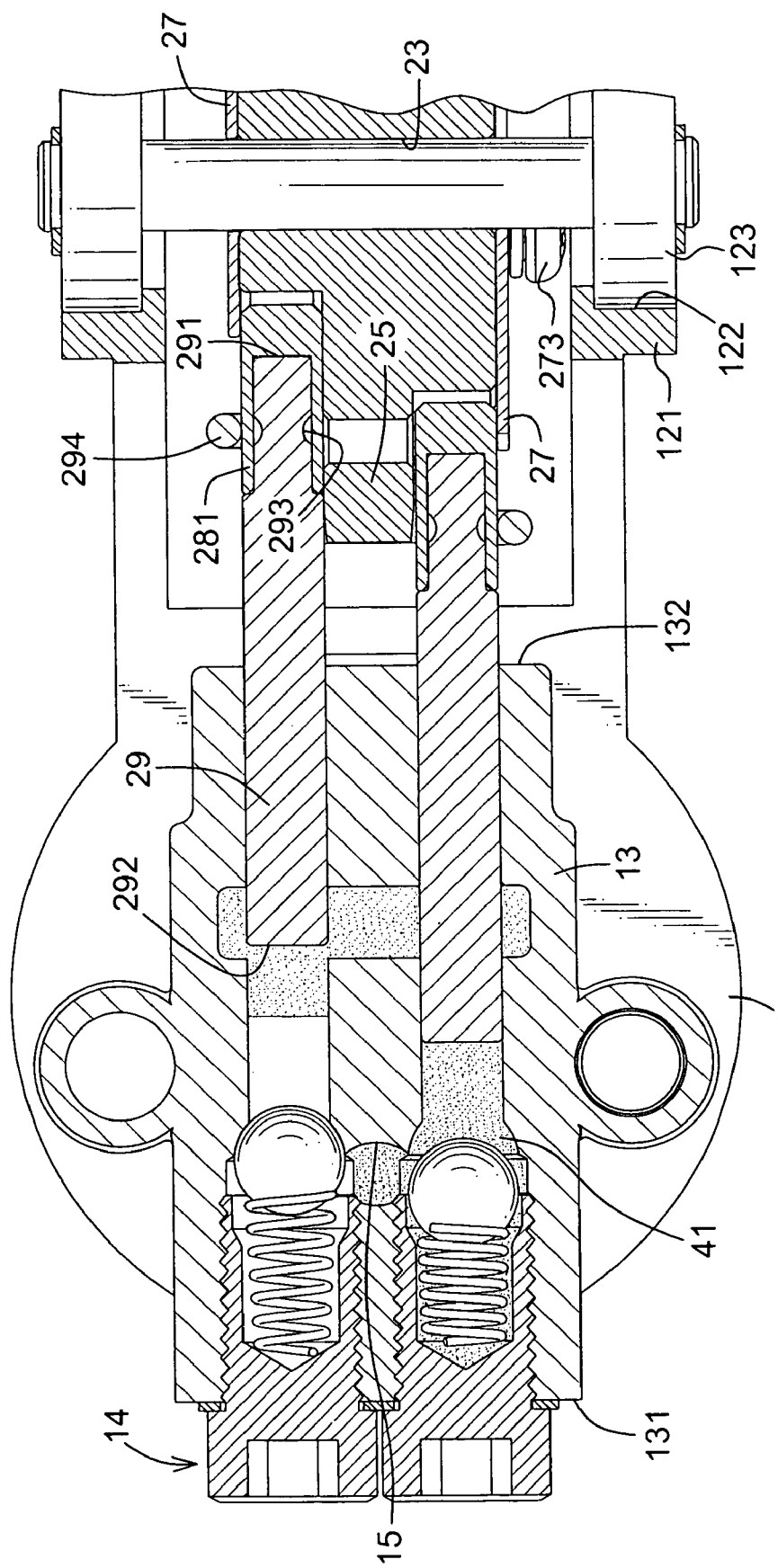
FIG. 4 is top view in partial section of the grease output device for the electrical grease gun in FIG. 1.
Figure 5:
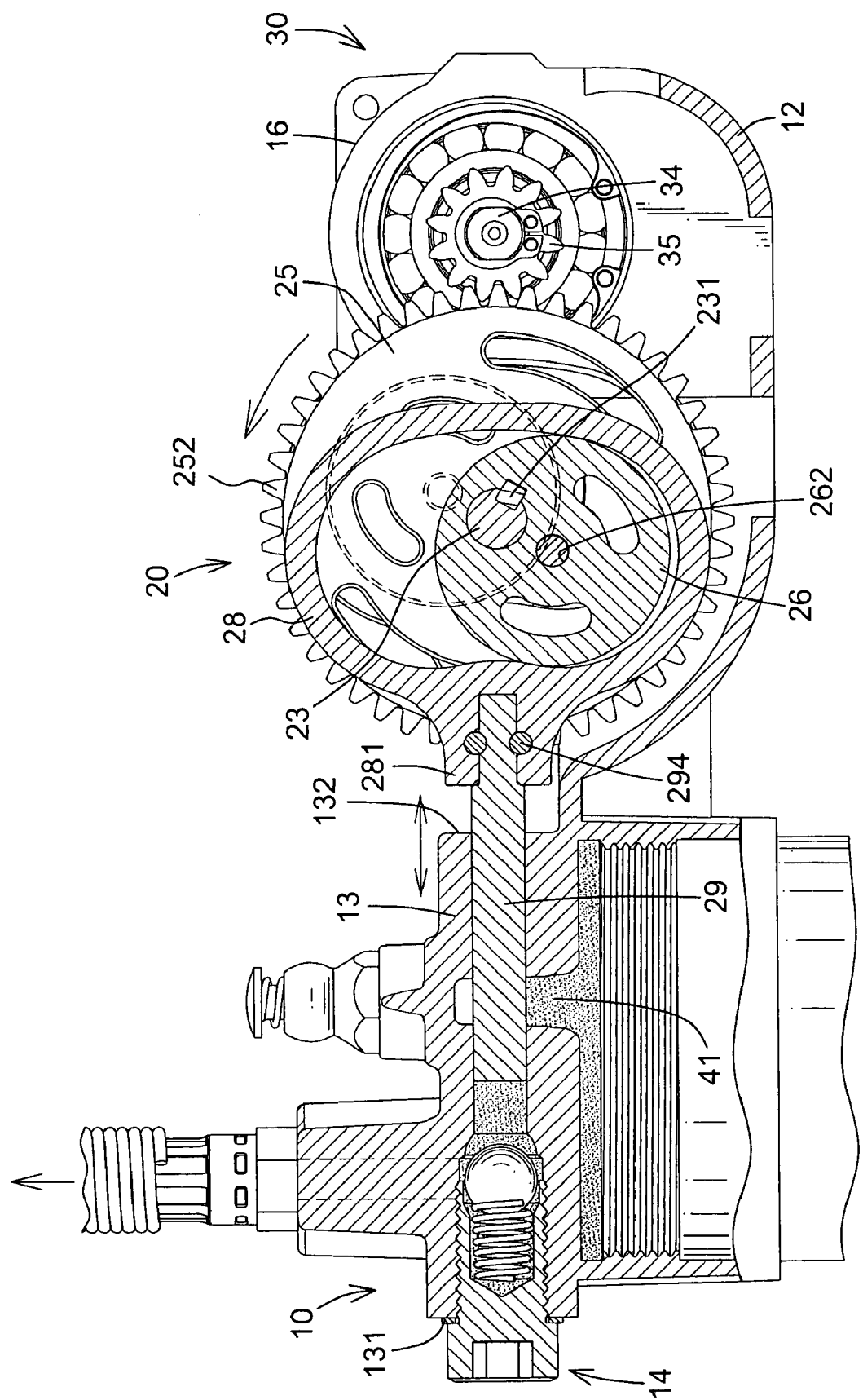
FIG. 5 is an operational front view in partial section of the grease output device for the electrical gun in FIG. 1.
Figure 6:
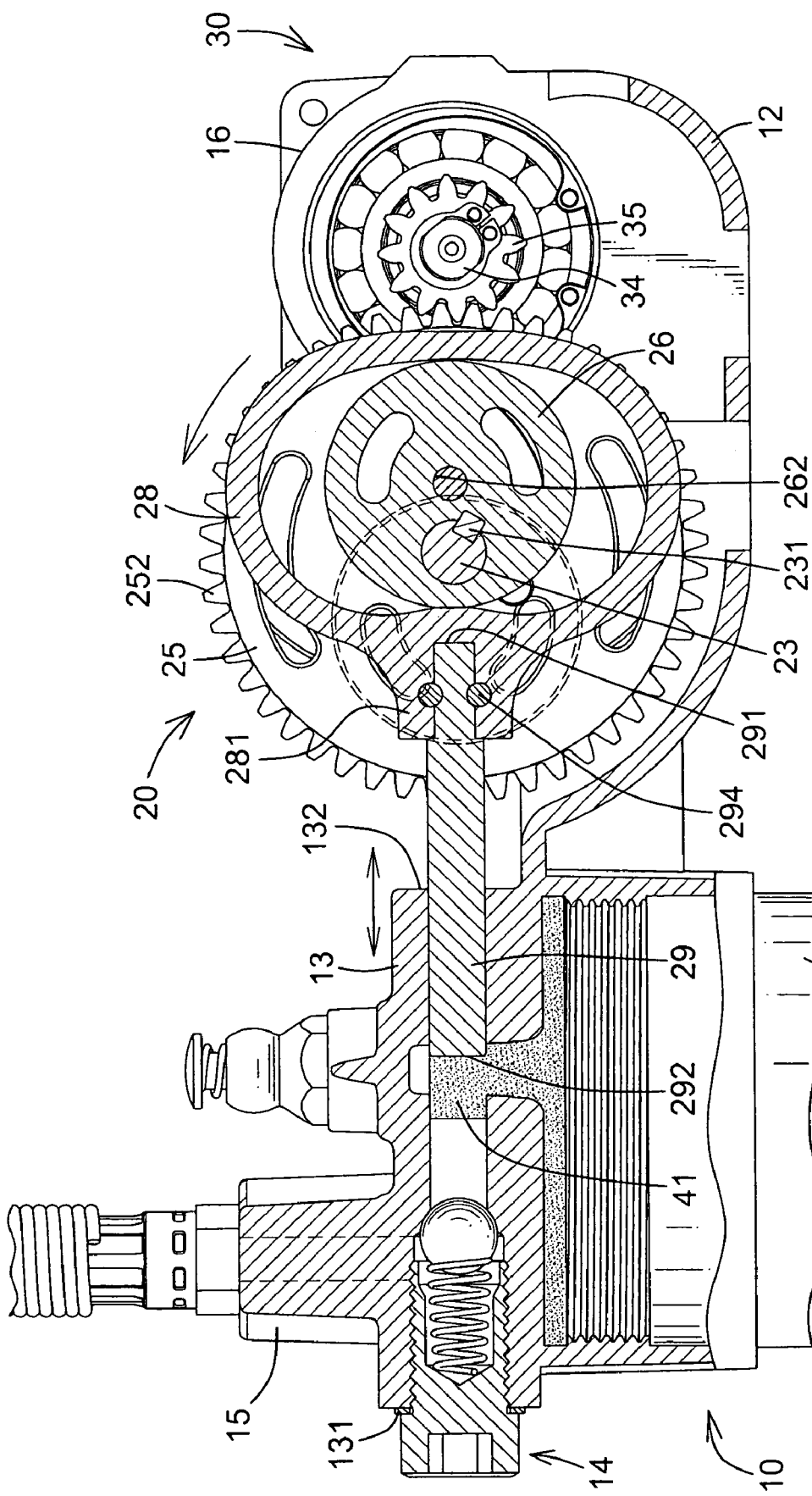
FIG. 6 is an operational front view in partial section of the grease output device for the electrical gun in FIG. 1.
Figure 7:
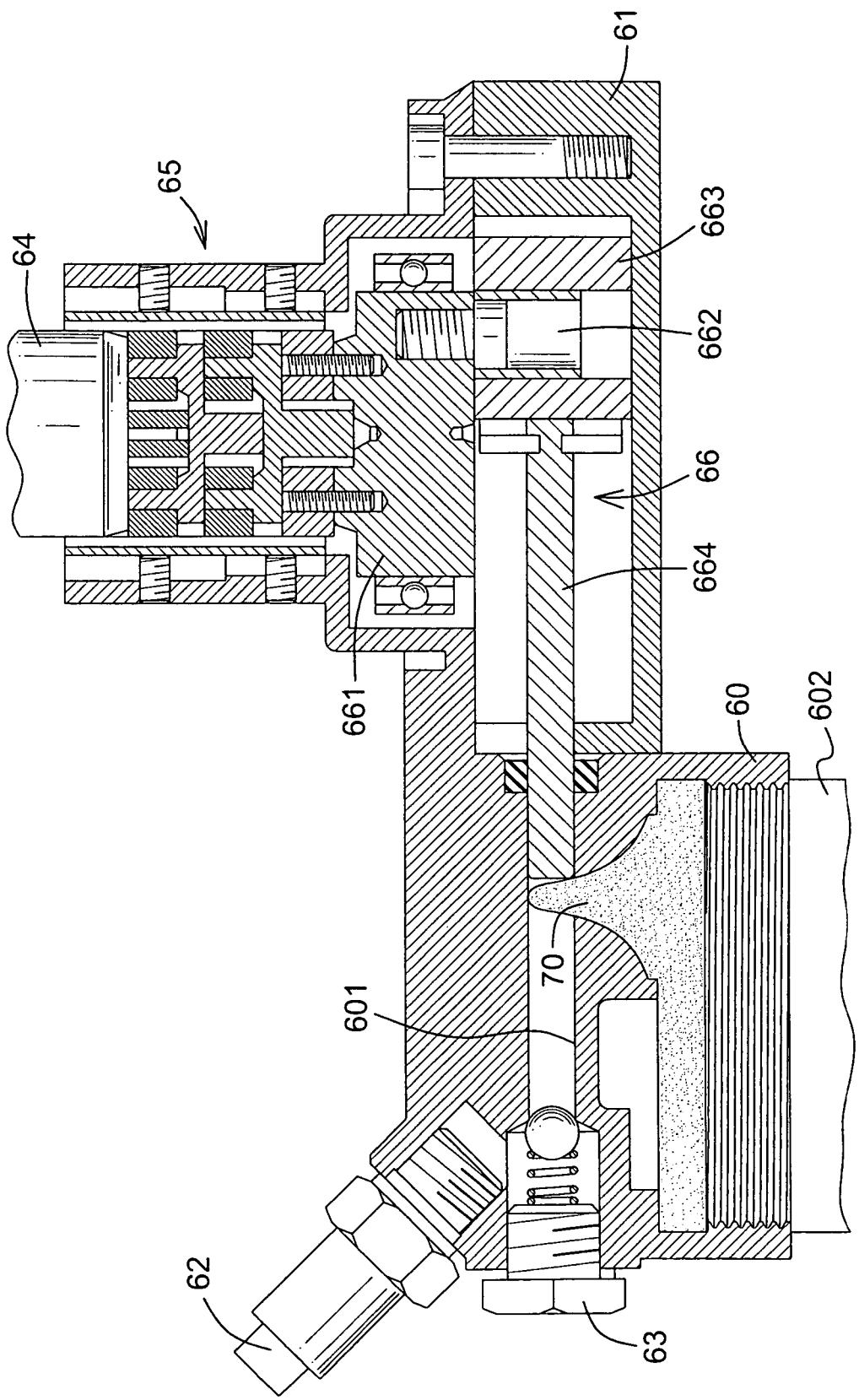
FIG. 7 is a side view in partial section of a conventional electrical grease gun in accordance with the prior art.
Figure 8:
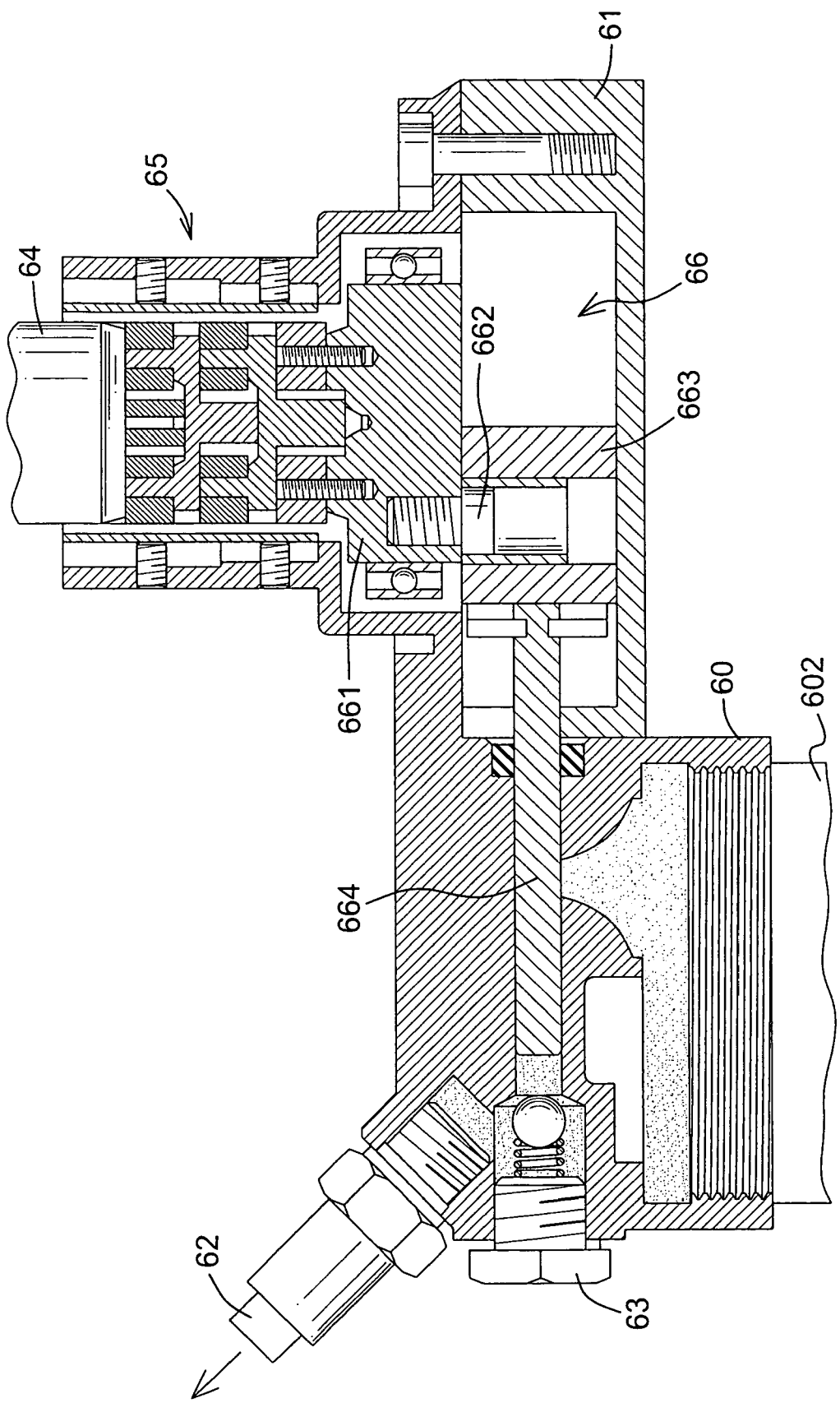
FIG. 8 is an operational side view in partial section of the conventional electrical grease gun in FIG. 7.

With reference to FIGS. 4-6, the planet gear assembly (33) drives the axle (34) so that the driving gear (35) is rotated. The driving gear (35) rotates the driven gear (25) and the bar (23) relative to the seat (12). Then the cams (26) contact the rings (28) by the rotation of the driven gear (25). Therefore, the pistol rods (29) are pushed by the rings (28) to move back and forth in the pipes (13). By the reciprocating movement of the two pistol rods (29) alternatively, the grease (41) can flow out of the body (10) successively and quickly through the pipe (13) and the connecting tube (15) to mitigate the damage of the pieces, to enhance the lifespan of the grease gun and to generate high efficiency.

It is to be understood, however, that even though numerous characteristics and advantages of the present invention have been set forth in the foregoing description, together with details of the structure and function of the invention, the disclosure is illustrative only. Changes may be made in details, especially in matters of shape, size, and arrangement of parts within the principles of the invention to the full extent indicated by the broad general meaning of the terms in which the appended claims are expressed.

What is claimed is:

1. A grease output device for an electrical grease gun comprising:
    a body having
        a holder;
        a seat connecting to the holder;
        two pipes mounted on a top end of the holder and parallel with each other, and each pipe having an outer opening and an inner opening; and
        two fastening boards mounted respectively on two sides of the seat;
    a double-cam member connecting to the body and having
        a driven unit mounted rotatably on the seat and having
            a bar connecting to the fastening board and having a key axially mounted on the bar, and
            a wheel assembly connecting to the bar and having a driven gear and two cams mounted respectively on two sides of the driven gear, wherein the cams are eccentrically mounted on the driven gear and misalign with each other; and
        a driving unit connecting to the driven unit and having
            two rings mounted respectively around the cams, and
            two pistol rods respectively connecting to the rings, and each pistol rod having
                a head formed in a first end of the pistol rod; and
                a foot formed in a second of the pistol rod and inserted into one of the pipes of the body via the inner opening in the pipe; and
    a driving member connecting to the body and having
        a motor connecting to the body;
        a planet gear assembly connecting to the motor;
        an axle connecting to the planet gear assembly; and
        a driving gear mounted securely on the axle and engaging with the driven gear.

2. The grease output device of an electrical grease gun as claimed in claim 1, wherein
    the driven gear has
        a first keyed hole defined in a center of the driven gear and engaging the bar and the key; and
        multiple teeth formed continuously on a periphery of the driven gear; and
    each cam has a second keyed hole defined through the cam, communicating with the first keyed hole in the driven gear and engaging with the bar.

3. The grease output device of an electrical grease gun as claimed in claim 1, wherein the body further comprises
    a jointing tube formed on a top end of the holder near the outer openings of the pipes and communicating with the pipes; and
    a nozzle connecting to a top end of the jointing tube.

4. The grease output device of an electrical grease gun as claimed in claim 3, wherein
    each ring has
        an ear adjacent to a corresponding inner opening of the pipe; and
        multiple jointing holes defined through the ear; and
    each pistol rod has
        a notch defined around the pistol rod adjacent to the head of the pistol rod; and
        a U-shaped clasp inserted into the jointing holes in a corresponding ring and mounted around the notch of the pistol rod.

5. The grease output device of an electrical grease gun as claimed in claim 4, wherein
    the body further comprises a collar formed on one of the fastening boards;
    the motor is attached to the collar; and
    the axle extends out of the collar.

6. The grease output device of an electrical grease gun as claimed in claim 5, wherein
    each cam has a threaded hole defined in a center of the cam adjacent to the second keyed hole in the cam;
    two caps respectively connect to the cams, and each cap has
        a first through hole defined through the cap and corresponding to the second keyed hole in a corresponding cam; and a second through hole defined through the cap and corresponding to the threaded hole in the corresponding cam; and two bolts are inserted respectively into the second through holes in the caps and respectively screw into the threaded holes in the cams.

7. The grease output device of an electrical grease gun as claimed in claim 6, wherein each fastening board has a hole defined through the fastening board;

two bearings are inserted respectively into the holes of the fastening boards; and two ends of the bar are inserted respectively into the bearings.

8. The grease output device of an electrical grease gun as claimed in claim 7, wherein an adjusting member connects to the outer openings of the pipes.

9. The grease output device of an electrical grease gun as claimed in claim 1, wherein each ring has an ear adjacent to a corresponding inner opening of the pipe; and multiple jointing holes defined through the ear; and each pistol rod has a notch defined around the pistol rod adjacent to the head of the pistol rod; and a U-shaped clasp inserted into the jointing holes in a corresponding ring and mounted around the notch of the pistol rod.

10. The grease output device of an electrical grease gun as claimed in claim 1, wherein the body further comprises a collar formed on one of the fastening boards;

the motor is attached to the collar; and the axle extends out of the collar.

11. The grease output device of an electrical grease gun as claimed in claim 1, wherein each cam has a threaded hole defined in a center of the cam adjacent to the second keyed hole in the cam;

two caps respectively connect to the cams, and each cap has a first through hole defined through the cap and corresponding to the second keyed hole in a corresponding cam; and a second through hole defined through the cap and corresponding to the threaded hole in the corresponding cam; and two bolts are inserted respectively into the second through holes in the caps and respectively screw into the threaded holes in the cams.

12. The grease output device of an electrical grease gun as claimed in claim 1, wherein each fastening board has a hole defined through the fastening board;

two bearings are inserted respectively into the holes of the fastening boards; and two ends of the bar are inserted respectively into the bearings.

13. The grease output device of an electrical grease gun as claimed in claim 1, wherein an adjusting member connects to the outer openings of the pipes.

* * * * *